United States Patent Office 3,436,758
Patented Apr. 1, 1969

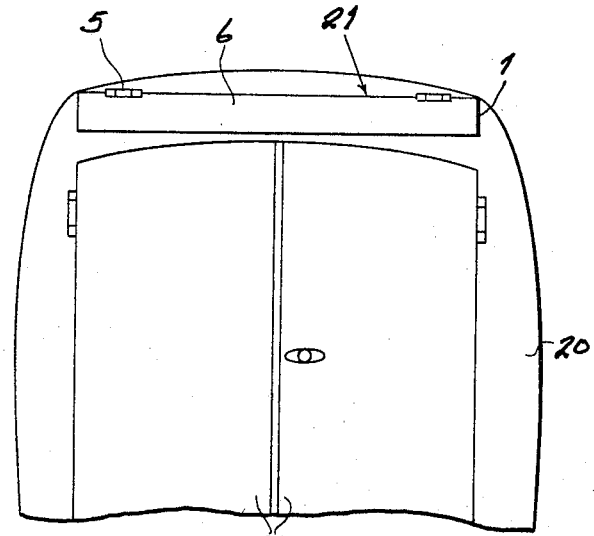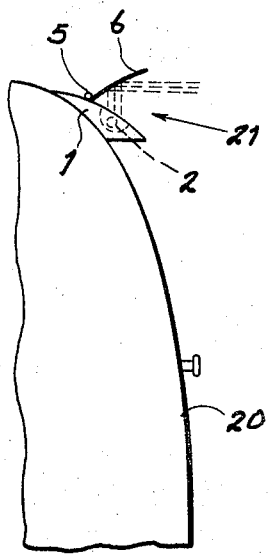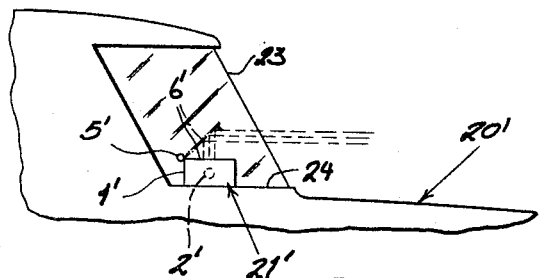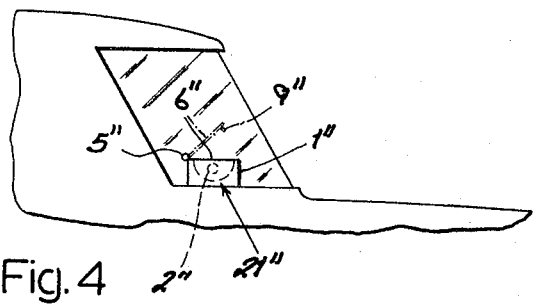

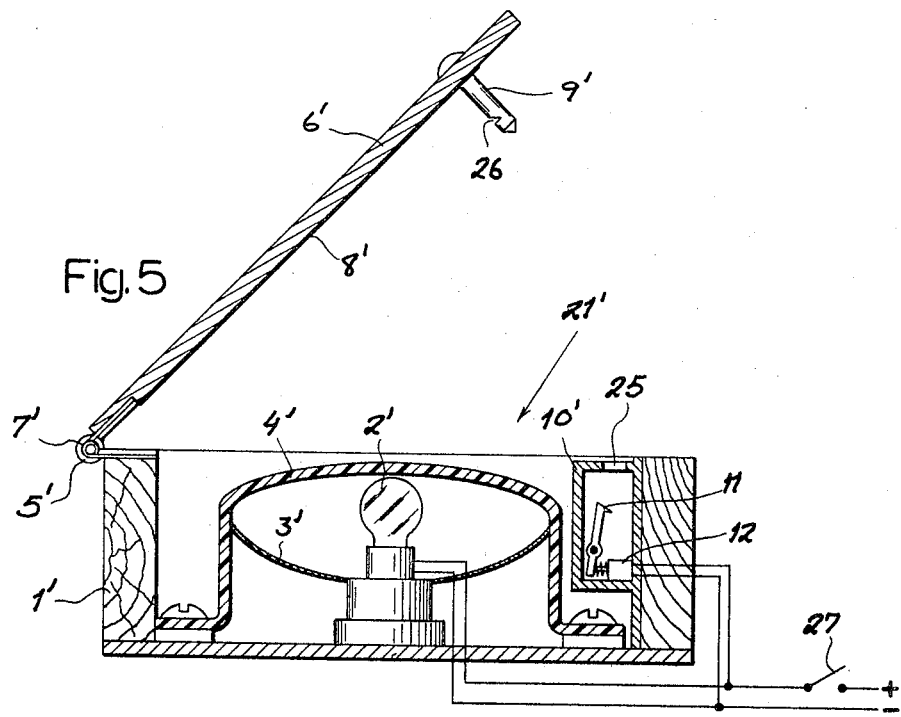
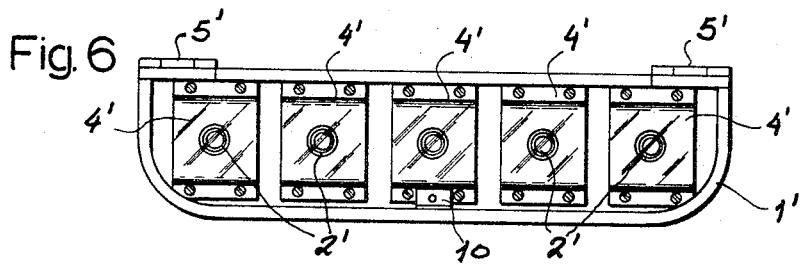
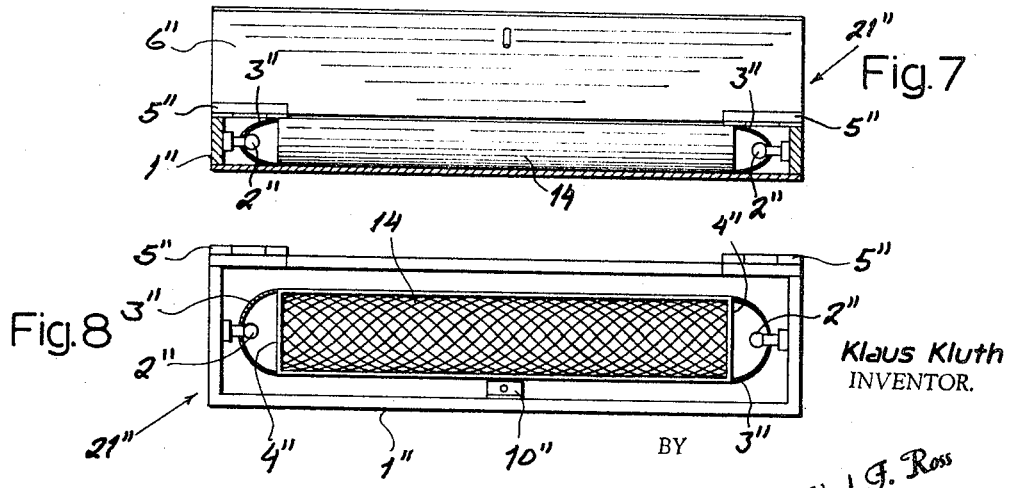
Klaus Kluth
INVENTOR.
BY Karl J. Ross
Attorney

3,436,758
VEHICULAR WARNING DEVICE HAVING SPRING POSITIONED REFLECTING MEMBER
Klaus Kluth, Gallenkampstr. 10, Duisburg, Germany
Filed Feb. 23, 1967, Ser. No. 618,060
Int. Cl. G08b 5/00, 23/00; B60q 1/00
U.S. Cl. 340—376     8 Claims

ABSTRACT OF THE DISCLOSURE

Warning device adapted to be placed on the back of an automotive vehicle to indicate sudden stops or breakdowns, with one or more blinking lamps in an upwardly open housing normally overlain by a swingable lid; the lid, hinged onto a forward edge of the housing, is internally reflecting so that, when swung into an open position with an inclination of approximately 45°, it causes rearward deflection of light rays coming from the housing which preferably includes a translucent shield for diffusing the light trained upon the lid. The release of this spring-loaded lid may occur, manually or automatically, simultaneously with the lighting of the lamps.

---

The present invention relates to a luminous warning device for automotive vehicles.

Conventional brake lights are generally visible only over short distances, particularly in darkness or fog, and can usually be seen only by the driver of an immediately following vehicle. They are, therefore, ineffectual in preventing chain collisions in which the operator of one car is alerted too late to the fact that the vehicle in front of him has to stop suddenly because of an obstacle farther ahead.

Various types of warning lamps, effective over greater distances and operable under emergency conditions, have already been proposed to reduce the risk of such accidents. Many of these prior systems, however, suffer from certain drawbacks such as complexity of construction or partial obstruction of the rear view of the operator.

It is, therefore, the general object of the present invention to provide an improved warning device of the character described which avoids the aforestated drawbacks and which, when placed in operation by a manually or automatically actuatable emergency switch, emits a distinctive light signal which can be seen over considerable distances and which will not be confused with the back lights of vehicles in motion.

This object is realized, pursuant to the present invention, by the provision of a warning device comprising a source of illumination, preferably of the blinking type, in an upwardly open housing which may extend over nearly the full width of the vehicle on whose back the housing is disposed, either externally, e.g. (in the case of station wagons, delivery trucks and the like) just below the roof, or internally, e.g. (in the case of a passenger car) on the shelf adjoining the rear window. The housing is normally overlain by a lid, hinged to its forward edge, which can be swung open into a position of approximately 45° inclination whereby light rays from the housing are deflected rearwardly toward a following vehicle or vehicles. To swing the lid into its open position, one or more biasing springs may be provided together with a detent, such as an electromagnetic latch, which responds to the actuation of an emergency switch to release the lid and, preferably, to energize the lamp or lamps at the same time.

Advantageously, in accordance with a further feature of the invention, the light emitted by the illumination source in the housing is of a diffused character so as to form a broad beam visible from various angles. To this end, the housing may contain a translucent shield interposed between the lamp or lamps and the reflecting lid. It is also desirable, for the purpose of increasing the light output, to make the housing internally reflecting, e.g. by means of a multifaceted wall surface of generally semi-cylindrical shape which may be irradiated from one or both ends.

The emergency switch referred to above may be operated manually or automatically, e.g. with the aid of an electric sensor known per se, which responds to a signal from a centrifugal governor upon rapid deceleration of the vehicle.

The invention will be described in greater detail with reference to the appended drawing in which:

FIG. 1 is a fragmentary rear view of a commercial vehicle equipped with an externally mounted warning device according to the invention;

FIG. 2 is a fragmentary side view of the rear of the vehicle shown in FIG. 1;

FIG. 3 is a fragmentary side view of the rear of a passenger vehicle internally provided with a warning device embodying the invention;

FIG. 4 is a view similar to FIG. 3, showing a modified device according to the invention;

FIG. 5 is an enlarged cross-sectional view of the device shown in FIG. 3;

FIG. 6 is a top view of the housing of the device shown in FIG. 5, with its lid removed;

FIG. 7 is a side-elevational view with its housing and lid shown in sections, of the device illustrated in FIG. 4; and FIG. 8 is a top plan view of the device of FIG. 7, with its lid removed.

In FIGS. 1 and 2 there is shown part of the body 20 of a delivery truck having a device 21 according to the invention mounted above its rear doors 22. The device 21 comprises an upwardly open housing 1 whose length equals the width of the doors 22 and which is normally closed by a lid 6 swingably hinged at 5 to a forward edge of the housing. Rays from a light source 2 are rearwardly reflected by a mirrored inner surface of lid 6 when the latter is swung open, with an inclination of about 45° to the horizontal, as illustrated in FIG. 2.

In FIG. 3 there is shown a passenger vehicle 20' with a rear window 23 in front of which, on a shelf 24, a warning device 21' generally similar to that of FIGS. 1 and 2 is disposed. A lid 6', hinged at 5' to an upwardly open prismatic housing 1', directs light rays from a source 2' rearwardly through window 23 when swung into its open position.

FIG. 4 shows a similar device 21" whose housing 1" having a cover 6" hinged to it at 5", is of a modified construction more fully described hereinafter in conjunction with FIGS. 7 and 8. A light source within the housing has been indicated at 2".

Reference will now be made to FIGS. 5 and 6 for a more detailed description of the device 21' with its housing 1' and its lid 6'. The light source 2' within the housing consists of several bulbs placed in a row so as to illuminate substantially the entire width of the rear window 23 (FIG. 3). When the lid 6' is opened, translucent shields 4', e.g. of plastic material, overlie the lamps 2' to diffuse the light emanating therefrom, part of this light being intercepted by reflectors 3' disposed underneath the lamps 2'. Lid 6' is biased upwardly by one or more leaf springs 7' which bear, in the vicinity of hinges 5', upon its reflecting underside 8' constituted, for example, by a conventional mirror or by a metal layer. A bolt 9' near the center of the rear edge of lid 6' fits into a hole 25 of a casing 10' which houses a latch 11 engageable with a notch 26 of the bolt; an electromagnet 12 is energizable, via an emergency switch 27, to light the lamps 2' and to disengage the latch 11 from the bolt 9' whereby the springs 7' can swing the lid 6' into its operative or open position shown in FIG. 5.

The device 21" illustrated in detail in FIGS. 7 and 8 has an outer housing 1" provided with a generally semicylindrical insert 14 formed, e.g. by injection molding, with a multiplicity of polygonal internal reflecting facets, in the shape of shallow pyramids, which are irradiated, through translucent shields 4", from a pair of lamps 2" disposed at the ends of this insert and provided with respective reflectors 3". Lid 6", hinged to housing 1" at 5", is again provided with a latch bolt 9" (seen in FIG. 4) which fits into a detent casing 10" in the manner and for the purpose described above.

The light sources 2, 2' and 2" may be conventional blinking lamps and, if desired, may also take the form of elongated bulbs extending over the major length of the associated housing. Switch 27 may be operated manually or automatically as set forth above.

What is claimed is:

1. In an automotive vehicle provided with emergency switch means, the combination therewith of a warning device comprising an upwardly open housing disposed at the rear of the vehicle, a swingable lid hinged to a forward edge of said housing, illuminating means in said housing, biasing means urging said lid into an open position with an inclination of substantially 45°, said lid having a reflecting inner surface for directing light rays from said illuminating means rearwardly in said open position, latch means normally holding said lid closed against the force of said biasing means, and circuit means connecting said latch means to said switch means for releasing said lid, thereby enabling said biasing means to move said lid into said open position.

2. The combination defined in claim 1 wherein said housing extends over nearly the full width of the vehicle.

3. The combination defined in claim 1 wherein said circuit means connects said illuminating means to said switch means for energization concurrently with release of said lid.

4. The combination defined in claim 1 wherein said illuminating means comprises a source of diffused light rays.

5. The combination defined in claim 4 wherein said source includes at least one blinking lamp and a translucent shield interposed between said lamp and said lid.

6. The combination defined in claim 5 wherein said housing is provided with internal reflecting means positioned for direct illumination by said lamps.

7. The combination defined in claim 6 wherein said internal reflecting means comprises a multifaceted wall surface of generally semicylindrical configuration.

8. The combination defined in claim 7 wherein said lamp is disposed at an end of said multifaceted surface.

References Cited
UNITED STATES PATENTS 2,939,108    5/1960    McIntire ---------- 340—97 X JOHN W. CALDWELL, *Primary Examiner.*

HAROLD J. PITTS, *Assistant Examiner.*

U.S. Cl. X.R.

340—97, 321